United States Patent [19]

Fischer et al.

[11] 3,979,304

[45] Sept. 7, 1976

[54] METHOD FOR DRILLING AND TREATING SUBTERRANEAN FORMATIONS USING A LOW FLUID LOSS AGENT

[75] Inventors: Paul W. Fischer, Whittier; David S. Pye, Brea; Julius P. Gallus, Anaheim, all of Calif.

[73] Assignee: Union Oil Company of California, Brea, Calif.

[22] Filed: Nov. 20, 1974

[21] Appl. No.: 525,366

Related U.S. Application Data

[63] Continuation-in-part of Ser. No. 293,388, Sept. 29, 1972, Pat. No. 3,882,029, and a continuation-in-part of Ser. No. 293,389, Sept. 29, 1972, Pat. No. 3,870,668.

[52] U.S. Cl. .............................. 252/8.5 C; 166/282; 166/283; 166/295; 252/8.5 LC; 252/8.55 R; 252/8.55 C; 252/311.5; 260/28.5 AV
[51] Int. Cl.² .................... C09K 7/02; E21B 43/26; E21B 43/27
[58] Field of Search ................. 252/8.55 R, 8.55 C, 252/8.5 C, 8.5 P, 311.5, 8.5 LC; 260/28.5 R, 28.5 AV, 28.5 A; 166/295, 282, 283

[56] References Cited
UNITED STATES PATENTS

| | | | |
|---|---|---|---|
| 2,684,948 | 7/1954 | Cross | 252/311.5 |
| 3,302,719 | 2/1967 | Fischer | 252/8.55 R X |
| 3,455,390 | 7/1969 | Gallus | 252/8.55 R X |
| 3,593,794 | 7/1971 | Fischer et al. | 252/8.55 R X |
| 3,601,194 | 8/1971 | Gallus | 166/283 |
| 3,630,280 | 12/1971 | Fischer et al. | 166/283 |
| 3,644,130 | 2/1972 | Evans et al. | 252/311.5 X |
| 3,684,012 | 8/1972 | Scheffel et al. | 166/283 |
| 3,711,405 | 1/1973 | Pye et al. | 252/8.55 R |
| 3,717,204 | 2/1973 | Scheffel et al. | 252/8.55 R X |
| 3,753,903 | 8/1973 | Fischer et al. | 252/8.5 A |

*Primary Examiner*—Herbert B. Guynn

[57] ABSTRACT

Well drilling, completion and workover operations, hydraulic fracturing, acidizing, and other well treating operations are improved by the addition to the drilling or treating fluid of an oil-soluble, water-insoluble low fluid loss agent comprising a particulated, homogeneous solid solution of (1) wax; (2) an oil-soluble polyhydroxy higher fatty acid partial ester surface active agent; and (3) a water-dispersible surface active agent such as polyoxyethylene alkyl phenol, a polyethylene glycol higher fatty acid ester, a polyoxyethylene polyhydroxy higher fatty acid ester, a polyoxyethylene tertiary fatty amine, or a polyoxyethylene fatty amide condensate. The agent can optionally include small amounts of a polymeric material and/or a higher fatty alcohol.

8 Claims, No Drawings

METHOD FOR DRILLING AND TREATING SUBTERRANEAN FORMATIONS USING A LOW FLUID LOSS AGENT

This application is a continuation-in-part of applications Ser. No. 293,388 and Ser. No. 293,389, both filed Sept. 29, 1972, and now issued as U.S. Pat. Nos. 3,882,029 and 3,870,668, respectively.

This invention relates to well drilling and treating operations, and more particularly to the use of a low fluid loss agent for reducing the permeability of permeable earth formations. The processes of this invention are particularly related to hydraulic fracturing and acidizing, well treating, and drilling and completing oil and gas wells that penetrate permeable subterranean formations.

Although high fluid permeability is a desirable characteristic of a hydrocarbon producing formation, many well drilling, fracturing and treating operations are adversely affected when a well penetrates such highly permeable formations. The effectiveness and efficiency of these processes are substantially improved by temporarily plugging the more permeable strata to reduce the loss of drilling, fracturing, acidizing or other well treating fluids to the formation. Accordingly, low fluid loss agents have been developed for use in these applications. Also, particulate plugging agents are used as diverting agents in multiple fracturing operations, and to plug selected strata to obtain fluid shutoff.

In these applications, it is essential that the process employ a temporary fluid loss control or plugging agent that can be readily removed from the hydrocarbon producing zones to prevent permanent loss of permeability and an attendant reduction in oil production rate. Removal may be effectively accomplished by utilizing an agent that is soluble in the formation hydrocarbons. However, many of the prior art processes use materials which are either insoluble under bottom hole conditions, or are so highly soluble that they are difficult to place in the formation and fail to maintain the required plug during the treating operation. It is therefore essential that the low fluid loss or plugging agent possess the property of controlled solubility wherein a satisfactory solid plug will be formed for a period of time, and whereupon the plug will thereafter be removed by being slowly dissolved in the formation hydrocarbons.

It is also advantageous in some operations to utilize a material that is insoluble in water, thereby leaving any water producing strata permanently sealed. Thus, selective plugging is effected, the hydrocarbon producing strata being temporarily plugged and the water producing strata being permanently sealed. On removal of the temporary plugging agent from the hydrocarbon producing strata, oil and gas production capability is fully restored, while water production is permanently eliminated or substantially decreased.

Each of the aforesaid well treating processes commonly require a temporary plugging agent capable of being formed into small solid particles of controlled size, preferably by an inexpensive technique. The material should be slowly soluble in the formation hydrocarbons and insoluble in water at formation conditions to accomplish the desired selective plugging and complete restoration of hydrocarbon permeability. Particle size is important in controlling the distance that the plugging agent penetrates into the formation and the degree of fluid shutoff obtained. Therefore, it is essential that the particles do not agglomerate or stick together in the treating fluid to form clumps of widely varying dimensions during the treating operation. While other properties of the particulate agent may influence particle agglomeration, agglomeration is largely controlled by the tackiness of the particle surface. Hence, it is necessary that the plugging particles or agents exhibit a low degree of tackiness on exposure to air at ambient temperatures and also remain nontacky or nonsticky under exposure to formation hydrocarbons and to the treating fluids. In addition, particles which are somewhat resilient possess superior plugging properties since they deform to effectively fill flow passages. Also, high mechanical and impact strength is desirable to avoid size reduction of individual particles by attrition.

Various slowly oil-soluble, water-insoluble particulate agents have been developed. In particular, U.S. Pat. No. 3,316,965 discloses the use of homogeneous solid particles of nongaseous hydrocarbon and polymer; U.S. Pat. No. 3,342,263 discloses the use of discrete solid particles of a homogeneous solid mixture of a polymer and a halogenated aromatic hydrocarbon melting above about 120° F.; U.S. Pat. No. 3,363,690 discloses the use of particles of a homogeneous solid mixture of a polymer and an alcohol melting above about 120° F.; U.S. Pat. No. 3,302,719 discloses solid particles comprised of a homogeneous mixture of polymer, wax and resin; U.S. Pat. No. 3,455,390 discloses the use of micron size particles of wax or homogeneous mixtures of wax and polymer; and U.S. Pat. Nos. 3,593,794 and 3,630,280 disclose the use of particles of a homogeneous mixture of specific ethylene-vinyl acetate copolymers and specific waxes.

It is preferred that the slowly oil-soluble, water-insoluble particulate agents be distributed to the well site as free-flowing particulate solids that can be packaged in paper sacks or fiberboard drums or cartons. These agents are then dispersed in a carrier liquid and employed in the well drilling or treating process in conventional manner. Most often these slowly oil-soluble low fluid loss agents are employed in aqueous dispersions, e.g., in aqueous drilling, completion and workover fluids, or in aqueous fracturing fluids, aqueous acid systems or other aqueous well treating fluids. However, it has been found that because of the oil-wettable surface characteristics of these particles, they are difficult to disperse in the aqueous systems to provide stable dispersions that are not subject to separation upon standing, and that these systems do not exhibit the low fluid loss properties desired. As disclosed in U.S. Pat. No. 3,601,194 and U.S. Pat. No. 3,753,903, these problems can be somewhat ameliorated by incorporating certain surface active agents into the aqueous dispersion, and by proper formulation of the dispersion. However, need nevertheless exists for processes employing a dry, particulate, slowly oil-soluble, water-insoluble solid low fluid loss agent that can be dispersed in an aqueous liquid and that exhibits the desired low fluid loss property.

Accordingly, it is a primary object of this invention to provide an improved method for temporarily reducing the permeability of an oil-containing subterranean formation.

Another object of the invention is to provide improved well drilling and treating processes for plugging or retarding flow through earth formations that do not permanently reduce the permeability of the formation to hydrocarbon fluids.

Yet another object of the invention is to provide a process for fracturing subterranean formations wherein a diverting agent is deposited in the fracture to retard the flow of additional fracturing fluid therein so as to effect multiple fractures in the formation.

Still another object of the invention is to provide an improved fracturing process wherein an effective low fluid loss agent is included in the fracturing fluid so that the oil-containing fractures will not be permanently plugged.

A further object of the invention is to provide a process for acidizing subterranean formations wherein a diverting agent is deposited on the walls of the well bore to divert the flow of additional acid so as to effect the acidizing of other parts of the formation.

Other objects and advantages of the invention will be apparent to those skilled in the art from the description thereof which follows.

Briefly, this invention contemplates well drilling, completion and workover operations, hydraulic fracturing, acidizing, and other well treating operations employing an oil-soluble, water-insoluble, low fluid loss agent to inhibit the flow of fluid through a permeable subterranean formation without permanently reducing the oil permeability of the formation. The agent comprises a particulated, homogeneous solid solution of (1) wax; (2) an oil-soluble polyhydroxy higher fatty acid partial ester surface active agent; (3) a water-dispersible surface active agent such as a polyoxyethylene alkyl phenol, a polyethylene glycol higher fatty acid ester, a polyoxyethylene polyhydroxy higher fatty acid ester, a polyoxyethylene tertiary fatty amine, or a polyoxyethylene fatty amide condensate; and optionally (4) a polymeric material and/or (5) a higher fatty alcohol.

In use, the particulate solid low fluid loss agent is dispersed in a carrier liquid and introduced into a well penetrating a permeable earth formation so as to contact the formation. The dispersed solids are deposited onto the formation thereby rendering the formation less permeable to the carrier fluid. The particulate solid low fluid loss agent is selected to be slowly soluble in the connate hydrocarbons, or in a subsequently injected oil, at the reservoir temperature to the extent that substantially all of the plugging agent is removed within a reasonably short time, such as between about 1 and 6 days after returning the well to production. Solid compositions that are completely solubilized by the reservoir oil in less than 12 hours or greater than 6 days have been found to be undesirable for many of the well treating processes. Thus, the permeability reducing particulate matter deposited in the oil-bearing strata is dissolved by these hydrocarbons on return of the well to production with substantially no permanent loss of oil permeability.

The low fluid loss composition of this invention is slowly soluble in the connate oil and substantially insoluble in water, brine and acid. Although the low fluid loss compositions of this invention can be employed in both oleaginous and aqueous carrier liquids, they are especially useful with aqueous systems. The particulate solid low fluid loss agent can be dispersed in aqueous carrier liquids without being dissolved therein; thus, the solid agent retains its particulate form while dispersed in the aqueous fluid; and further, the properties of the aqueous fluid are not altered by dissolution of the solid material. Because of the fluid loss additive of this invention possesses the property of slow solubility in hydrocarbons, it also can be effectively used with hydrocarbon base treating fluids. Thus, injection of the treating fluid can be accomplished without substantial dissolution of the solid additive material, yet the additive will be substantially completely solubilized on sustained contact with hydrocarbon. Additive materials having this property of slow oil solubility are uniquely suited for injection in oil dispersion, and also have the desirable characteristic of sealing hydrocarbon zones for a short period until the additive is substantially solubilized by sustained contact with liquid hydrocarbon.

On injection into the well, the dispersion tends to penetrate into the formation to a greater or lesser extent along all of the formation face exposed to the fluid. The quantity of fluid entering into the formation and the depth of penetration depends upon the porosity and permeability of the structure and upon the injection conditions. As the dispersion passes into the formation, some of the solids may be filtered from the carrier liquid so as to form a mat of solid particles on the formation surface exposed to the fluid tending to prevent further penetration of fluid into the formation. However, in most zones having a more open structure, dispersed solids are carried into the formation with the carrier liquid to be deposited in the pores and to therein form interstitial plugs preventing or retarding the flow of fluid through the formation. Since the dispersion has greater tendency to enter into the more permeable zones, these zones will be preferentially plugged so as to result in a partially plugged formation of more or less uniform permeability. The flow of fluid into the formation rapidly declines as the plug is established, the total quantity of fluid lost to the formation being controlled, in part, by the quantity of additive material employed. Thus, it can be seen that loss of the carrier fluid to the formation at the face of the well wall and along fracture faces extending into the formation is minimized by the combination of a mat of solid particles formed on the formation face and by interstitial plugging within the formation. Also, once permeability reduction is established, the loss of subsequently injected fluids is reduced as long as the plugging material remains intact.

It is desired that the oil solubility of the particles be such that upon contact with connate oil under formation conditions, the particles will be dissolved in oil, or at least solubilized to the extent that they are removed from oil producing zones on return of the well to production. Since the particles are substantially insoluble in connate water and brine, plugs established in water producing zones, without the presence of oil to function as a solvent, will be largely permanent in nature resulting in selective water shutoff.

The slowly oil-soluble, water-insoluble, particulate solid low fluid loss compositions of this invention are homogeneous solid solutions of wax and selected oil-soluble and water-insoluble surface active agents, i.e., the surface active agents are dissolved in the wax or substantially uniformly dispersed therein to provide a homogeneous solid composition. Similarly, in those solutions containing the polymer material and/or the higher fatty alcohol, these agents are also dissolved in the wax or substantially uniformly dispersed therein. If desired, finely divided oil-insoluble solid materials such as silica, calcium carbonate, and the like, or finely divided high density inorganic weighting agents such as lead oxide and the like, can be dispersed in the homogeneous solid solution. However, in many applications it is desired that the solid solution be free of insoluble inorganic materials so that the eventual dissolution in oil is complete.

Any of a wide variety of waxes can be employed in the compositions of this invention. Suitable waxes include crystalline and microcrystalline petroleum waxes, beeswax, carnauba wax, condellia wax, montan wax, and the like. One preferred class of waxes includes the fully and partially refined paraffin waxes melting between about 125° F. and 170° F. Another class of waxes and wax-like substances that can be employed, particularly in higher temperature applications, are long chain aliphatic hydrocarbon and oxidized hydrocarbon waxes melting above about 170° F., such as the synthetic Fischer-Tropsch waxes. These waxes are characteristically straight or branched chain aliphatic hydrocarbons and oxygenated aliphatic hydrocarbons such as aliphatic carboxylic acids, esters and amides having molecular weights higher than the paraffin waxes, and particularly having molecular weights of about 500 to 2500. A preferred class of synthetic waxes are long chain aliphatic hydrocarbon and oxidized hydrocarbon waxes melting between about 195° F. and 250° F.

The waxes incorporated into the compositions of this invention are selected for their melting points and solubility in oil. The selected wax must exhibit a melting point above the maximum temperature to which it will be subjected, and preferably at least about 10° F. above this temperature. Also, the wax should be at least slowly soluble in oil so that it will not permanently damage oil-bearing strata of the formation, and if necessary, can be removed by swabbing the well with oil.

The waxes useful in the particulate compositions of this invention can be blends of one or more of the aforementioned waxes, and can optionally include a polymer component to improve the strength of the particles and reduce surface tackiness, and to decrease the oil solubility of the particle. The polymers that can be incorporated into the wax include (1) addition polymers of an olefin having between two and four carbon atoms in the monomer molecule, such as polyethylene, polypropylene, polybutylene and polyisobutylene; (2) copolymers of an olefin having between two and four carbon atoms and an alkyl acrylate containing not more than four carbon atoms in the alkyl group, such as esters formed by the reaction of acrylic acid and an alcohol having no more than four carbon atoms; (3) copolymers of an olefin having between two and four carbon atoms and esters formed by the reaction of butenic acid and an alcohol having no more than four carbon atoms; and (4) copolymers of an olefin having between two and four carbon atoms and an ester formed by the reaction of acetic acid and an unsaturated alcohol having no more than four carbon atoms. Preferred polymers include polyethylene, polypropylene, polybutylene, copolymers of ethylene and vinyl acetate, copolymers of ethylene and ethyl acrylate, and copolymers of ethylene and methyl methacrylate.

The oil-soluble surface active agent employed in these compositions is a polyhydroxy higher fatty acid partial ester, exemplary of which are the glyceryl higher fatty acid partial esters, and particularly the mono- and di- esters of saturated fatty acids containing between 12 and 20 carbon atoms; mannitol higher fatty acid partial esters, and particularly the mono- and di- esters of saturated fatty acids containing between 12 and 20 carbon atoms; and sorbitan higher fatty acid partial esters, and particularly, the mono- and di- esters of saturated fatty acids containing between 12 and 20 carbon atoms. These esters can be ethoxylated to a low degree so long as oil-solubility is not lost, e.g., to the extent of not more than about four mole equivalents of ethylene oxide. Specific esters that can be used in the composition of this invention include glyceryl monolaurate, glyceryl monomyristate, glyceryl monopalmitate, glyceryl monostearate, glyceryl 1,3-distearate, mannityl monolaurate, mannityl monomyristate, mannityl monopalmitate, mannityl monostearate, mannityl 1,3-distearate, sorbitan monolaurate, sorbitan monomyristate, sorbitan monopalmitate, sorbitan monostearate, and sorbitan distearate. A particularly preferred oil-soluble surface active agent is sorbitan monostearate. Any of the foregoing polyhydroxy higher fatty acid partial esters can be incorporated into the homogeneous solid solution, or mixtures of two or more of such agents can be employed.

The water-dispersible surface active agents useful in these compositions are polyoxyethylene alkyl phenols, polyethylene glycol higher fatty acid esters, polyoxyethylene polyhydroxy higher fatty acid partial esters, polyoxyethylene tertiary fatty amines, and polyoxyethylene fatty amide condensates. Exemplary polyoxyethylene alkyl phenols include the mono- and di-alkyl phenols containing from about 6 to 16 carbon atoms in the alkyl group and from about 5 to about 150 or more mole equivalents of ethylene oxide. Exemplary polyethylene glycol higher fatty acid esters include esters of polyethylene glycols having molecular weights of about 300 to 10,000 and saturated fatty acids containing between 12 and 20 carbon atoms. Exemplary polyoxyethylene polyhydroxy higher fatty acid esters include polyoxyethylene glyceryl and sorbitan mono- and di - fatty acid esters of saturated fatty acids containing between about 12 and 20 carbon atoms and which contain from about 5 to about 150 or more mol equivalents of ethylene oxide. Exemplary polyoxyethylene tertiary fatty amines include tertiary amine condensation products of about 12 to 60 mol equivalents of ethylene oxide and saturated primary fatty amines containing from about 12 to 20 carbon atoms. Exemplary polyoxyethylene fatty amide condensates include condensation products of about 15 to 60 mol equivalents of ethylene oxide and saturated fatty amides containing from about 12 to 20 carbon atoms. Specific water-dispersible surface active agents useful in the compositions of this invention include polyoxyethylene nonyl phenol and polyoxyethylene dinonyl phenol containing from about 5 to about 150 mol equivalents of ethylene oxide; polyethylene glycol monolaurate, polyethylene glycol monomyristate, polyethylene glycol monopalmitate, and polyethylene glycol monostearate esters of polyethylene glycols having molecular weights of about 300 to 10,000, polyoxyethylene glyceryl and sorbitan partial esters of lauric, myristic, palmitic and stearic acids containing from about 5 to about 150 mol equivalents of ethylene oxide; tertiary amine condensation product of ethylene oxide and primary stearic amine containing from about 12 to about 60 mol equivalents of ethylene oxide; and the ethylene oxide condensation product of stearic amide containing from about 15 to about 60 mol equivalents of ethylene oxide. Preferred surface active compounds include polyoxyethylene (100) nonyl phenol, polyoxyethylene (100) dinonyl phenol, polyethylene glycol 300 monolaurate, polyethylene glycol 900 monostearate, polyethylene glycol 1000 monostearate, polyethylene glycol 6000 monostearate, polyoxyethylene (20) glycerol monostearate and polyoxyethylene (20) sorbitan monostearate, the designations (20) and (100) indicating the mol equivalents of ethylene oxide in the compound and the designations 300, 900, 1000 and 6000 indicating the approximate molecular weight of the polyethylene glycol employed to form the ester. A particularly preferred water-dispersible surface active agent is polyethylene glycol 6000 monostearate.

The compositions of this invention are prepared by heating the ingredients to a temperature above the melting point of the highest melting ingredient, such as to a temperature between about 200° and 500° F., and mixing the molten ingredients to obtain a homogeneous liquid mass of uniform composition. The molten mass is then particulated and solidified by prilling in a flowing stream of cool gas, or alternatively, the molten mass can be cooled until solidified and then particulated by cutting, grinding, milling, dicing, pelletizing, and the like.

The solid particles produced by these procedures vary widely in size and shape, with the particular size and shape desired depending upon the process in which the particulate agents are employed and the conditions under which they are used. Typically, these particles can be spheroids, cubes, granules, buttons, flat discs, or mixtures thereof, having mean diameters in the range of from about ½-inch to about 0.1 micron. More particularly, the particles can be cubes, buttons, or discs having mean diameters of from about ⅛-inch to about ½-inch, spheroids or granules in the size range of from about 4 to 200 mesh U.S. Standard screen, or particles having mean diameters of from about 0.1 to 50 microns.

The larger size particles are generally preferred for use in diverting and plugging applications, and the particles less than 50 microns in size are preferred for use as fluid loss agents in drilling, fracturing and acidizing operations. A preferred low fluid loss additive for dispersion in an aqueous carrier liquid consists of finely divided, noncolloidal solid particles wherein substantially none of the particles have diameters greater than about 50 microns nor smaller than about 0.1 micron in size. While the particles may be of a uniform size within the aforesaid size range, fluid loss control is enhanced when the particles are of varying sizes distributed throughout the operable size range. An especially preferred additive comprises a mixture of various size solid particles wherein between about 60 and 90 weight percent of the particles are within a 0.1 to 20 micron size range, and the balance of the particles being within the 20 to 50 micron size range.

It has been found that many of the oil-soluble, water-insoluble formulations used in the processes of this invention are incompatible in the liquid state under certain temperature conditions, i.e., the molten liquid ingredients of the composition tend to separate into separate liquid phases. This incompatibility is particularly observed as the molten compositions are cooled to the solidification temperature. Thus, a single phase homogeneous liquid may be obtained at the mixing temperature, which separates into separate phases on cooling. Phase separation causes non-uniformity of the solid solution, resulting in a poor additive product. Phase separation can be avoided and a uniform homogeneous product obtained by incorporating into the composition a small amount of an oil-soluble higher fatty alcohol such as a fatty alcohol containing 10 to 14 carbon atoms. Exemplary fatty alcohols include decyl alcohol, lauryl alcohol, and myristol alcohol, with lauryl alcohol being particularly preferred. The concentration of fatty alcohol required to achieve homogeniety is critical, with separation of the constituents occurring both with too low and excessive concentrations of alcohol. While the critical concentration of fatty alcohol generally falls within the range of about 0.5 to 5 weight percent, the concentration required to obtain homogeniety depends upon the specific composition of the solid solution and the fatty alcohol employed, and is generally within a range of about ± 0.5 weight percent within this range. For example, the critical composition of a specific fatty alcohol required to render a given composition homogeneous may vary from about 1.5 to about 2.5 weight percent. The concentration of fatty alcohol required for any specific composition can be determined experimentally.

Broadly, the compositions of this invention comprise about 30 to 75 weight percent of wax, 10 to 25 weight percent of oil-soluble surface active agent, and 15 to 35 weight percent of water-dispersible surface active agent. Optionally, the composition can contain from about 1 to 4 weight percent of polymer component and/or from about 0.5 to 5 weight percent of fatty alcohol. A preferred composition comprises about 45 to 55 weight percent of wax, 15 to 20 weight percent of oil-soluble surface active agent, 25 to 30 weight percent of water-dispersible surface active agent, 1 to 4 weight percent of polymer material, and 1 to 4 weight percent of fatty alcohol.

One particularly preferred composition comprises about 45 to 55 weight percent of paraffin wax having a melting point of about 165° F.; 15 to 20 weight percent of glyceryl monostearate or sorbitan monostearate; 25 to 30 weight percent of polyethylene glycol 6000 monostearate; 1 to 4 weight percent of an ethylene/vinyl acetate copolymer containing about 17 to 19 weight percent vinyl acetate and exhibiting a Melt Index of about 2 to 3 grams/10 minutes; and 1.5 to 2.5 weight percent of lauryl alcohol.

The compositions of this invention are useful in treating permeable subterranean formations. In its broadest application, the process of this invention comprises contacting a subterranean formation penetrated by a well with a dispersion of the aforesaid composition in a suitable carrier liquid injected into the well, for reducing the permeability of the formation. This treatment can comprise a single temporary and selective plugging step, or it can be an integral part of a comprehensive fracturing, well drilling, acidizing, or solvent treating process. Also, the particulate composition of this invention can be effectively used as a low fluid loss agent in drilling fluids employed in well drilling, and particularly as a low fluid loss agent in completion fluids employed in the drilling of oil and gas wells, and in workover fluids employed in recompleting oil and gas wells. In the drilling and workover applications, the drilling fluid is circulated from the surface to a drilling zone in a formation during a rotary drilling operation, and at least a portion of the fluid is returned to the surface. The particulate compositions of this invention can be incorporated into a fracturing fluid employed in hydraulically fracturing the earth formation surrounding a well, wherein the fracturing fluid having the low fluid loss agent dispersed therein is injected through the well and into contact with the formation at a pressure and volume flow rate sufficient to fracture the formation, and the composition can be employed in chemically treating, acidizing, and other well treating operations wherein it is desired to control fluid loss to permeable underground structures.

The invention is further illustrated by the following examples which are illustrative of specific modes of practicing the invention and are not intended as limiting the scope of the invention as defined by the appended claims.

EXAMPLE 1

A series of slowly oil-soluble, water-insoluble compositions useful in the processes of this invention are prepared by melting and combining at 165° F. melting point paraffin wax, glyceryl monostearate, and a selected water-dispersible surface active agent in the proportions of 54.5 weight percent wax, 18.2 weight percent glyceryl monostearate, and 27.3 weight percent of a selected water-dispersible surface active agent. In certain of the compositions an ethylene/vinyl acetate copolymer marketed by E. I. duPont de Nemours Company under the trademark ELVAX 460 is substituted for a portion of the wax. A small amount of lauryl alcohol is included in some of the blends to improve the homogeneity of the solid solution. The molten ingredients are gently mixed to obtain a homogeneous liquid composition which is particulated to obtain finely divided solid particles. The water-dispersible surface active agents employed in these compositions are listed in Table I.

TABLE I

Water-Dispersible Surface Active Agents

| Identification No. | Manufacturer | Trademark | Chemical Type |
|---|---|---|---|
| A-1 | Armour Ind. Chem. Co. | Ethomeen 18/60 | Ethylene oxide cond. product of stearic amine |
| A-2 | Emery Industries Inc. | Emery 15393 | PEG 6000 monostearate |
| A-3(a) | '' | '' | '' |
| A-4(b)(c) | '' | '' | '' |
| A-5(b) | '' | — | PEG 4000 monostearate |
| A-6(b)(d) | Armour Ind. Chem. Co. | Ethomid HT/60 | Ethylene oxide cond. product of fatty acid amine |

(a)Contains 4.5 weight percent ELVAX 460
(b)Contains 2.0 weight percent ELVAX 460
(c)Contains 1.7 weight percent lauryl alcohol
(d)Contains 1.2 weight percent lauryl alcohol

EXAMPLE 2

Another series of slowly oil-soluble, water-insoluble compositions useful in the processes of this invention are prepared substantially in accordance with the technique employed in Example 1 excepting that sorbitan monostearate is employed as the oil-soluble surface active agent. The water-dispersible surface active agents employed in these compositions are listed in TABLE II.

TABLE II

Water-Dispersible Surface Active Agents

| Identification No. | Manufacturer | Trademark | Chemical Type |
|---|---|---|---|
| B-1 | Armour Ind. Chem. Co. | Ethomeen 18/60 | Ethylene oxide cond. product of stearic amine |
| B-2(a) | '' | '' | '' |
| B-3(a) | Emery Industries Inc. | Emsorb 6905 | POE (20) sorbitan monostearate |

(a)Contains 2.0 weight percent ELVAX 460.

EXAMPLE 3

The slowly oil-soluble, water-insoluble solid particulate compositions prepared in Examples 1 and 2 are tested for homogeniety, Izod hardness, relative stickiness and melting point.

Homogeniety is determined by casting the molten composition in a block and cooling to solidify the material. The solid block is then fractured and visually examined to determine if there is any ascertainable separation.

Relative stickiness is determined by placing molten droplets of the composition on a horizontal metal work sheet maintained at room temperature. Relative stickiness is determined by the degree of adhesion of the solidified droplets to the metal work sheet as determined by the following scale:

| Relative Stickiness | |
|---|---|
| 0 | No adhesion. |
| 1 | Slight adhesion, easily brushed off with spatula. |
| 2 | Some adhesion, can be removed by light scraping with spatula. |
| 3 | Moderate adhesion, can be removed by moderate scraping with spatula. |
| 4 | Strong adhesion, can be removed by vigorous scraping with spatula. |
| 5 | Material bonded to metal. |

The results of these tests are reported in Table III.

TABLE III

| Identification No. | Homogeneity | Izod Strength | Relative Stickness | Melting Point,°F. |
|---|---|---|---|---|
| A-1 | Uniform | 0.8 | 3 | 156 |
| A-2 | Uniform | 0.8 | 3 | 160 |
| A-3 | Uniform | 0.8 | 0 | 161 |
| A-4 | Uniform | 1.0 | 1 | 160 |
| A-5 | Slight Separation | 0.1 | <1 | 161 |
| A-6 | Uniform | 1.0 | 2 | 161 |
| B-1 | Uniform | 0.8 | 3 | 163 |
| B-2 | Uniform | 0.2 | <1 | 160 |
| B-3 | Separation | 0.4 | 1 | 162 |

TABLE V

| Identification No. | Wax | Oil-Soluble Surface Active Agent | Water-Dispersible Surface Active Agent |
|---|---|---|---|
| D-1 | 40 wt.% 140° MP paraffin wax | 25 wt.% glyceryl monolaurate | 35 wt.% PEG 400 monolaurate |
| D-2 | 45 wt.% 140° MP paraffin wax | 23 wt.% glyceryl monopalmitate | 32 wt.% PEG 600 monomyristate |
| D-3 | 50 wt.% 140° MP paraffin wax | 20 wt.% glyceryl monomyristate | 30 wt.% PEG 9000 monopalmitate |
| D-4 | 55 wt.% 130° MP paraffin wax | 18 wt.% glyceryl 1,3-distearate | 27 wt.% POE 20 glyceryl monosterate |
| D-5 | 60 wt.% 130° MP paraffin wax | 15 wt.% mannityl monopalmitate | 25 wt.% POE 20 glyceryl monopalmitate |
| D-6 | 60 wt.% 165° MP paraffin wax | 15 wt.% mannityl monostearate | 25 wt.% POE 10 glyceryl 1,3-distearate |
| D-7 | 60 wt.% 140° MP paraffin wax | 15 wt.% sorbitan monolaurate | 25 wt.% POE 10 sorbitan monolaurate |
| D-8 | 70 wt.% 140° MP paraffin wax | 10 wt.% sorbitan monopalmitate | 20 wt.% POE 20 sorbitan 1,3-distearate |
| D-9(a)(b) | 51 wt.% 165° MP paraffin wax, 10 wt.% oxidized hydrocarbon wax | 18 wt.% glyceryl monostearate | 9 wt.% PEG 6000 monostearate |
| D-10(a)(b) | 51 wt.% Fischer-Tropsch wax | 18 wt.% glyceryl monostearate | 27.3 wt.% PEG 6000 monostearate |
| D-11(a)(b) | 10 wt.% 165° MP paraffin wax, 41 wt.% Fischer-Tropsch wax | 18 wt.% glyceryl monostearate | 27.3 wt.% PEG 6000 monostearate |

(a) Contains 1.7 wt.% lauryl alcohol.
(b) Contains 2 wt.% ethylene/vinyl acetate copolymer.

EXAMPLE 4

Another series of slowly oil-soluble, water-insoluble compositions are prepared by melting and combining a 165° F. melting point paraffin wax, sorbitan monostearate, and a water-dispersible surface active agent selected from Table IV in the proportions of 54.5 weight percent wax, 27.3 weight percent sorbitan monostearate and 18.2 weight percent water-dispersible agent. The molten ingredients are gently mixed to obtain a homogeneous liquid composition which is particulated to obtain finely divided solid particles.

TABLE IV

Water-Dispersible Surface Active Agents

| Identification No. | Manufacturer | Trademark | Chemical Type |
|---|---|---|---|
| C-1 | Emery Industries, Inc. | Emmon 15332 | POE (100) nonyl phenol |
| C-2 | " | Emmon 15323 | POE dinonyl phenol |
| C-3 | " | Emery 14089 | POE (20) glyceryl monosterate |
| C-4 | " | Emery 15278 | PEG 300 monostearate |
| C-5 | " | Emery 15283 | PEG 900 monostearate |
| C-6 | " | Emery 15392 | PEG 1000 monostearate |
| C-7 | " | Emery 15393 | PEG 6000 monostearate |
| C-8 | Armour Ind. Chem. Co. | Ethomeen 18/60 | Ethylene oxide cond. product of stearic amine |
| C-9 | Emery Industries, Inc. | Emsorb 6905 | POE (20) sorbitan monostearate |

EXAMPLE 5

The slowly oil-soluble, water-insoluble, particulate homogeneous solid solutions having the compositions listed in Table V are prepared.

EXAMPLE 6

This example illustrates the criticality of the concentration of fatty alcohol in promoting homogeniety of the solid solution. A series of slowly oil-soluble, water-insoluble compositions are prepared by melting and combining 52.5 weight percent of a 165° F. melting point paraffin wax, 18.2 weight percent glyceryl monostearate, 27.3 weight percent of polyethylene glycol 6000 monostearate, 2.0 weight percent of an ethylene/vinyl acetate copolymer marketed by E. I. duPont de Nemours Company under the trademark ELVAx 460. The molten blend was divided into six portions and 0, 0.4, 0.8, 1.2, 1.7 or 3.3 weight percent of lauryl alcohol added to each of the blends. The molten ingredients are gently mixed to obtain a homogeneous liquid composition which is cast in the form of a block and cooled so solidify the composition. The solid block is then fractured and visually examined to determine if there is any ascertainable separation. The following results are obtained:

| Lauryl Alcohol Content, Wt.% | Homogeniety |
|---|---|
| 0 | Separation |
| 0.4 | Separation |
| 0.8 | Slight separation |
| 1.2 | Trace separation |
| 1.7 | Homogeneous |

-continued

| Lauryl Alcohol Content, Wt.% | Homogeniety |
|---|---|
| 3.3 | Separation |

EXAMPLE 7

A slowly oil-soluble, water-insoluble particulate solid composition is prepared by melting and combining 51 weight percent of a 165° F. melting point paraffin wax marketed by the Union Oil Company of California under the trademark Aristo 165, 18 weight percent of sorbitan monostearate marketed by Emery Industries, Inc. under the trademark Emsorb 2505, 27 weight percent of polyethylene glycol 6000 monostearate marketed by Emery Industries, Inc. under the trademark Emery 15393, 2 weight percent of an ethylene/vinyl acetate copolymer marketed by the E. I. duPont de Nemours Company under the trademark ELVAX 460, and 2 weight percent lauryl alcohol. The molten ingredients are gently mixed to obtain a homogeneous liquid composition which is particulated to obtain finely divided solid particles having average diameters of between about 0.1 and 50 microns.

The dry particulated solid composition is shipped to an off-shore drilling site wherein it is incorporated into an aqueous drilling fluid to function as a fluid loss agent. The well is drilled and successfully completed with this drilling fluid.

EXAMPLE 8

This example illustrates a process of this invention for drilling a well. This well had previously been drilled to a depth of 3,108 feet and then plugged to a depth of 2,924 feet with pea gravel and cement. For a number of years the well was produced from a productive interval from 2,911 to 2,922 feet. However, it is now desired to open lower zones to production.

The plug is drilled out using a 3 ¾-inch diameter bit on a conventional tubing string. Brine is used as the drilling fluid, and is circulated from the surface to the drilling zone and returned to the surface. The well is drilled from 2,924 feet to 3,005 without incident, but at 3,005 feet, circulation is lost to the formation. Approximately 750 pounds of diverting agent particles are added to a gelled brine and the drilling is resumed using this combined material as the drilling fluid. The diverting agent comprises particles of a slowly oil-soluble, water-insoluble homogeneous solid composition described in this invention, the particles having sizes in the range of 0.1 to 50 microns, with approximately 70 weight percent of the particles being within a 0.1 to 20 micron size, and 30 weight percent being between 20 and 50 microns in size. After addition of the diverting agent, good fluid circulation is observed; and drilling is continued to a depth of 3,109 feet without further difficulty.

The gelled brine is displaced from the well with ungelled brine, and again the formation did not take fluid. Then, 14 barrels of lease crude is placed in the well and allowed to stand overnight. After the oil soak, it is observed that the formation is open and readily capable of taking fluid.

EXAMPLE 9

This example illustrates a process of this invention for fracturing a subterranean oil-producing formation to stimulate the recovery of oil therefrom. A production well is completed in a reservoir with a total productive interval of 15 feet, perforated with two holes per foot at the depths of 4,903 to 4,908 feet and 4,918 to 4,928 feet.

Fracturing is accomplished by injecting 15,000 pounds of 20 to 40 mesh sand in 15,000 gallons of gelled brine into the well at a volumetric flow rate and pressure sufficient to fracture the formation. After approximately one-half of the fracturing fluid is injected, 15 pounds of diverting agent particles are slugged into the well and the fracturing fluid injection continued. The diverting agent comprises flat buttons approximately ⅛-inch to ⅜-inch in diameter, and are effective in plugging the existing fractures in the formation, and thereby divert the subsequently injected fracturing fluid to produce other fractures. The initial portion of the fracturing fluid is injected at a surface pressure of 950 psig; however, the injection pressure is increased to 1,500 psig after treatment with the diverting agent.

Upon completion of the fracturing operation, the well is flushed with lease crude and returned to production. The production rate of oil is observed and found to be substantially higher than the rate prior to fracturing, which indicates that the fracturing operation is successful and that the diverting agent particles are substantially removed from the oil-producing zones.

Alternatively, the diverting and plugging agents can be injected prior to the initial injection of the fracturing fluid so that the fracturing fluid will be diverted to the less permeable portions o the formation. As a further alternative, the plugging agent can be injected together with the fracturing fluid. The result in both cases would be more uniform fracturing of the formation.

EXAMPLE 10

This example illustrates a process of this invention for acidizing a subterranean, oil-containing reservoir to stimulate the recovery of oil therefrom. The well is completed in a relatively shallow reservoir with a total productive interval of about 10 feet perforated with two holes per foot at the depths of 3,066 to 3,072 feet and 3,082 to 3,086 feet.

The stimulation treatment is performed by injecting 3,000 gallons of 15 percent hydrochloric acid into the well, introducing 12 pounds of particulate diverting agent, and then injecting another 3,000 gallons of acid. The diverting agent comprises a 50–50 mixture of flat buttons approximately about ⅛-inch to about ⅜-inch in diameter and granules in the size range of from about 4 to 200 mesh U.S. Standard screen. The buttons, being of larger size, are effective in plugging the existing fractures and the granules are effective in plugging the pores of the formation. The initial slug of acid is injected into the well under vacuum. However, the second slug of acid, injected after treatment with the diverting agent, is injected at a surface pressure of 1,100 psig.

Since the first acid injection and the diverting agent will preferentially enter the more permeable portions of the formation, the subsequent injection of acid will be diverted to those less permeable portions of the reservoir which did not receive an effective acidizing by the initial acid injection.

Upon completion of the acid injection, the wall is flushed with lease crude and then with water, and the well returned to production. The production rate of oil is observed and found to be substantially higher than the rate prior to the stimulation treatment, which indicates that the stimulation treatment is successful and that the diverting agent particles are substantially removed from the oil-producing zones.

Alternatively, the diverting agents can be injected prior to the initial acid injection, or the diverting agent can be added directly to the acid solution. In both of these alternative methods, the result will be a more uniform acidizing treatment of the formation.

While particular embodiments of the invention have been described, it will be understood, of course, that the invention is not limited thereto since many modifications can be made and it is intended to include within the invention such modifications as are within the scope of the claims.

The invention having thus described, we claim:

1. A method for reducing the permeability of a permeable subterranean formation penetrated by a well bore, which comprises:
    preparing an aqueous dispersion by dispersing in an aqueous liquid a fluid loss reducing amount of discrete, slowly oil-soluble, water-insoluble solid particles consisting essentially of a homogeneous solid solution of (1) about 30 to 75 weight percent of wax; (2) about 10 to 25 weight percent of an oil-soluble polyhydroxy higher fatty acid partial ester surface active agent; (3) about 15 to 35 weight percent of a water-dispersible surface active agent selected from the group consisting of polyoxyethylene alkyl phenols, polyethylene glycol higher fatty acid esters, polyoxyethylene polyhydroxy higher fatty acid esters, polyoxyethylene tertiary fatty amines, and polyoxyethylene fatty amide condensates; and (4) about 0.5 to 5 weight percent of a fatty alcohol containing 10 to 14 carbon atoms; and
    injecting said dispersion into said well bore and into contact with said formation.

2. A method for treating a permeable subterranean formation penetrated by a well which comprises:
    preparing an aqueous dispersion by dispersing in an aqueous liquid a fluid loss reducing amount of discrete, slowly oil-soluble, water-insoluble particles consisting essentially of a homogeneous solid solution of (1) about 30 to 75 weight percent of wax; (2) about 10 to 25 weight percent of an oil-soluble polyhydroxy higher fatty acid partial ester surface active agent; (3) about 15 to 35 weight percent of a water-dispersible surface active agent selected from the group consisting of polyoxyethylene alkyl phenols, polyethylene glycol higher fatty acid esters, polyoxyethylene polyhydroxy higher fatty acid esters, polyoxyethylene tertiary fatty amines, and polyoxyethylene fatty amide condensates; and (4) about 0.5 to 5 weight percent of a fatty alcohol containing 10 to 14 carbon atoms;
    and injecting said dispersion into said well bore and into contact with said formation.

3. The method defined in claim 2 wherein said homogeneous solid solution consists essentially of (1) about 45 to 55 weight percent of paraffin wax; (2) about 15 to 20 weight percent of a glyceryl of sorbitan partial ester of a saturated fatty acid containing 12 to 20 carbon atoms or mixtures thereof; (3) about 25 to 30 weight percent of a monostearate ester of a polyethylene glycol having a molecular weight of about 300 to 10,000; (4) about 1 to 4 weight percent of an ethylene/vinyl acetate copolymer containing about 17 to 19 weight percent of vinyl acetate and exhibiting a melt index of about 2 to 3; and (5) about 0.5 to 5 weight percent of a fatty alcohol containing 10 to 14 carbon atoms; and wherein said particles have mean diameters between about 0.1 microns and ½ inch.

4. A method for drilling a well into a permeable subterranean formation, which comprises:
    preparing a drilling fluid by dispersing in an aqueous liquid a fluid loss reducing amount of discrete, slowly oil-soluble, waterinsoluble particles consisting essentially of a homogeneous solid solution of (1) about 30 to 75 weight percent of wax; (2) about 10 to 25 weight percent of an oil-soluble polyhydroxy higher fatty acid partial ester surface active agent; (3) about 15 to 35 weight percent of a water-dispersible surface active agent selected from the group consisting of polyoxyethylene alkyl phenols, polyethylene glycol higher fatty acid esters, polyoxyethylene polyhydroxy fatty acid esters, polyoxyethylene tertiary fatty amines, and polyoxyethylene fatty amide condensates; and (4) about 0.5 to 5 weight percent of a fatty alcohol containing 10 to 14 carbon atoms; and
    circulating said drilling fluid from the surface to a drilling zone in said formation during a drilling operation and returning to the surface at least a portion of said fluid.

5. The method defined in claim 4 wherein said homogeneous solid solution consists essentially of (1) about 45 to 55 weight percent of paraffin wax; (2) about 15 to 20 weight percent of a glyceryl or sorbitan partial ester of a saturated fatty acid containing 12 to 20 carbon atoms or mixtures thereof; (3) about 25 to 30 weight percent of a monostearate ester of a polyethylene glycol having a molecular weight of about 300 to 10,000; (4) about 1 to 4 weight percent of an ethylene/vinyl acetate copolymer containing about 17 to 19 weight percent of vinyl acetate and exhibiting a melt index of about 2 to 3; and (5) about 0.5 to 5 weight percent of a fatty alcohol containing 10 to 14 carbon atoms; and wherein said particles have mean diameters between about 0.1 microns and ½ inch.

6. A method of fracturing a permeable subterranean formation penetrated by a well bore, which comprises:
    preparing a fracturing fluid by dispersing in an aqueous liquid a fluid loss reducing amount of discrete, slowly oil-soluble, water-insoluble particles consisting essentially of a homogeneous solid solution of (1) about 30 to 75 weight percent wax; (2) about 10 to 25 weight percent of an oil-soluble polyhydroxy higher fatty acid partial ester surface active agent; (3) about 15 to 35 weight percent of a water-dispersible surface active agent selected from the group consisting of polyoxyethylene alkyl phenols, polyethylene glycol higher fatty acid esters, polyoxyethylene tertiary fatty amines, polyoxyethylene fatty amide condensates, and polyoxyethylene polyhydroxy higher fatty acid esters; and (4) about 0.5 to 5 weight percent of a fatty alcohol containing 10 to 14 carbon atoms; and
    injecting said fracturing fluid into said well bore and into contact with said formation at a pressure and volumetric flow rate sufficient to fracture said formation.

7. The method defined in claim 6 wherein said homogeneous solid solution consists essentially of (1) about 45 to 55 weight percent of paraffin wax; (2) about 15 to 20 weight percent of a glyceryl or sorbitan partial ester of a saturated fatty acid containing 12 to 20 carbon atoms or mixtures thereof; (3) about 25 to 30 weight percent of a monostearate ester of a polyethylene glycol having a molecular weight of about 300 to 10,000; (4) about 1 to 4 weight percent of an ethylene/vinyl acetate copolymer containing about 17 to 19 weight percent of vinyl acetate and exhibiting a melt index of about 2 to 3; and (5) about 0.5 to 5 weight percent of a fatty alcohol containing 10 to 14 carbon atoms; and wherein said particles have mean diameters between about 0.1 microns and ½ inch.

8. The method defined in claim 1 wherein said homogeneous solid solution also contains about 1 to 4 weight percent of a copolymer of ethylene and vinyl acetate.

* * * * *